United States Patent Office 3,133,920
Patented May 19, 1964

3,133,920
METHOD OF PREPARING AMINODITHIO-THIAZOLES

Albert F. Hardman, Northampton Township, Summit County, Ohio, assignor to The Goodyear Tire & Rubber Company, Akron, Ohio, a corporation of Ohio
No Drawing. Filed Feb. 21, 1958, Ser. No. 716,544
6 Claims. (Cl. 260—247.1)

This invention relates to 2-(4-morpholinyl-dithio) thiazoles and to a method of making these materials.

Morpholinyl-dithio thiazoles are powerful accelerators of vulcanization of rubber. These materials are particularly useful in compositions containing rubber in which a potent, delayed-action, non-scorching accelerator is needed to promote curing of the rubber.

The compounds with which this invention is concerned are the 2-(4-morpholinyl-dithio) thiazoles of the following general structure:

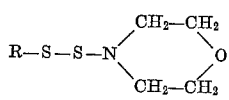

in which R is an azole selected from the group consisting of 2-thiazoles and 2-aryl thiazoles.

According to this invention, 2-(4-morpholinyl-dithio) thiazoles are prepared by reacting an azole sulfenamide with morpholine and sulfur.

The reaction appears to proceed according to the following equation in which N,N-diisopropyl-2-benzothiazolesulfenamide is used as a representative starting material.

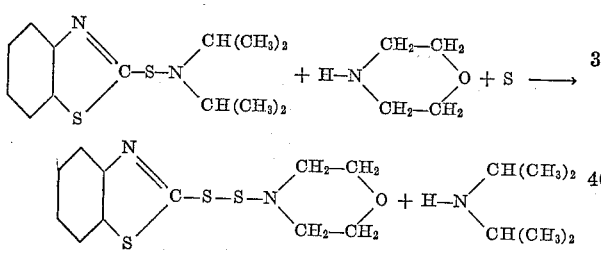

The practice of the invention is illustrated by the following representative examples.

Example 1

Seventeen grams of 2-benzothiazolesulfenamide, 3 grams of sulfur, 12 grams of morpholine and 75 milliliters of methanol were placed in a small three-necked flask equipped with a stirrer and a reflux condenser. The mixture was stirred and refluxed. Ammonia was liberated and after about five minutes the slurry became thick with crystals. After one hour, the mixture was cooled, the crystals were filtered off, and washed with cold methanol. A yield of 20 grams of a crystalline material having a melting range of 134–135° C. was obtained. Analysis showed the product to be 2-(4-morpholinyl-dithio) benzothiazole of 97.7% purity.

Example 2

Twenty-seven grams of N-cyclohexyl-2-benzothiazole sulfenamide, 3.5 grams of sulfur, 9 grams of morpholine and 75 milliliters of methanol were placed in a small three-necked flask equipped with a stirrer and a reflux condenser. The mixture was stirred and refluxed. After about five minutes, upon seeding, fibrous crystals began to separate. The mixture was refluxed about ten minutes longer, then cooled and filtered. The product was then washed with cold methanol. Twenty-three and five tenths grams of crystalline material having a melting range of 135–136° C. were obtained. The material analyzed 98.6% 2-(4-morpholinyl-dithio) benzothiazole.

Example 3

Twenty-seven grams of N,N-diisopropyl-2-benzothiazole sulfenamide, 3.5 grams of sulfur, 9 grams of morpholine and 75 milliliters of methanol were placed in a three-necked flask equipped with a stirrer and a reflux condenser. The mixture was stirred and refluxed. Crystals began to separate after about one hour. After 1½ hours the mixture was cooled, filtered, and the crystals were washed with cold methanol. Twenty grams of a crystalline material having a melting point of 132° C. were obtained. Analysis showed the material to be 2-(4-morpholinyl-dithio) benzothiazole.

Example 4

Twenty-four grams of N-tertiary butyl-2-benzothiazole sulfenamide, 3.5 grams of sulfur, 9 grams of morpholine and 75 milliliters of methanol were stirred in a small flask at room temperature for 6½ hours. The original suspension slowly dissolved. After about an hour, crystals of the product began to separate. A yield of 24.5 grams of product having a melting range of 129–132° C. was obtained.

The examples above illustrate the invention with particular respect to the preparation of 2-(4-morpholinyl-dithio) benzothiazole. Other morpholinyl dithio thiazoles can be prepared by similarly reacting other azole sulfenamides with morpholine and sulfur. Sulfenamides useful in the process of this invention can be represented by the structural formula

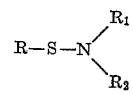

in which R represents a 2-thiazole nucleus and $R_1$ and $R_2$ are the same or different members selected from the group consisting of hydrogen, cyclohexyl radicals and alkyl radicals containing from 1 to 5 carbon atoms, and the sum of the number of carbon atoms of $R_1+R_2$ is an integer from 1 through 8. Representative examples of these sulfenamides are:

2-thiazole sulfenamide
2-benzothiazole sulfenamide
2-naphtholthiazole sulfenamide
N-methyl-2-thiazole sulfenamide
N-methyl-4-methyl-2-thiazole sulfenamide
N-methyl-4-ethyl-2-thiazole sulfenamide
N-methyl-2-benzothiazole sulfenamide
N-ethyl-2-thiazole sulfenamide
N-ethyl-4-methyl-2-thiazole sulfenamide
N-ethyl-4-ethyl-2-thiazole sulfenamide
N-ethyl-2-benzothiazole sulfenamide
N,N-dimethyl-2-thiazole sulfenamide
N,N-dimethyl-4-methyl-2-thiazole sulfenamide
N,N-dimethyl-4-ethyl-2-thiazole sulfenamide
N,N-dimethyl-2-benzothiazole sulfenamide
N,N-dimethyl-2-tetrahydrobenzothiazole sulfenamide
N,N-diethyl-2-thiazole sulfenamide
N,N-diethyl-4-methyl-2-thiazole sulfenamide
N,N-diethyl-4-ethyl-2-thiazole sulfenamide
N,N-diethyl-2-benzothiazole sulfenamide
N,N-diisopropyl-2-benzothiazole sulfenamide
N,N-dibutyl-2-benzothiazole sulfenamide
N,N-diethyl-2-tetrahydrobenzothiazole sulfenamide
N,N-dipropyl-2-thiazole sulfenamide
N,N-dipropyl-4-methyl-2-thiazole sulfenamide
N,N-dipropyl-4-ethyl-2-thiazole sulfenamide
N,N-dipropyl-2-benzothiazole sulfenamide N,N-dipropyl-2-tetrahydrobenzothiazole sulfenamide
N,N-dibutyl-2-thiazole sulfenamide
N-methyl, N-butyl-4-methyl-2-thiazole sulfenamide
N-methyl, N-butyl-4-ethyl-2-thiazole sulfenamide
N-methyl, N-butyl-2-benzothiazole sulfenamide
N-cyclohexyl-2-benzothiazole sulfenamide
N-methyl, N-butyl-2-tetrahydrobenzothiazole sulfenamide
Piperidyl-2-thiazole sulfenamide
Piperidyl-4-methyl-2-thiazole sulfenamide
Piperidyl-4-ethyl-2-thiazole sulfenamide
Piperidyl-2-benzothiazole sulfenamide
Piperidyl-2-tetrahydrobenzothiazole sulfenamide The examples illustrate the invention carried out in methanol as a solvent. Other solvents can be used instead of methanol. Representative examples of such solvents are ethanol, isopropanol, normal propanol, benzene, toluene and xylene. The process of the invention can also be carried out without a solvent being present by causing the materials to react in molten condition. In this case, when the amine of the sulfenamide is relatively volatile it can be distilled off, under reduced pressure, if desired and the product obtained in practically pure state. When the amine of the sulfenamide has a high boiling point, the product can be purified by leaching the amine out of the mixture with a solvent such as methanol or the product can be purified by dissolving it in a solvent and then crystallizing it.

The temperature at which the reaction is carried out is not critical, but it is desirable to use a temperature that will give reasonably fast reaction rates so that the process can be economically carried out. For most efficient use of the reactants, one mol of the sulfenamide is used to about one mol of morpholine and one mol of sulfur, but an excess of any of the reactants can be used as desired.

While certain representative embodiments and details have been shown for the purpose of illustrating the invention, it will be apparent to those skilled in this art that various changes and modifications may be made therein without departing from the spirit or scope of the invention.

I claim:

1. The method of preparing a 2-(4-morpholinyl dithio) thiazole which comprises reacting sulfur and morpholine with a sulfenamide of the general formula

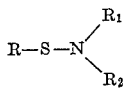

in which R is a 2-thiazole radical and $R_1$ and $R_2$ are the same or different members selected from the group consisting of hydrogen, cyclohexyl radicals, and alkyl radicals containing from 1 to 5 carbon atoms, and the sum of the number of carbon atoms of $R_1$ plus $R_2$ is an integer from 1 through 8.

2. The method of claim 1 in which the sulfenamide used is 2-benzothiazole sulfenamide.

3. The method of preparing a 2-(4-morpholinyl dithio) thiazole which comprises reacting sulfur and morpholine with a sulfenamide of the general formula

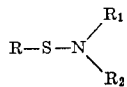

in which R is a 2-thiazole radical and $R_1$ and $R_2$ are the same or different members selected from the group consisting of hydrogen, cyclohexyl radicals, and alkyl radicals containing from 1 to 5 carbon atoms, and the sum of the number of carbon atoms of $R_1$ plus $R_2$ is an integer from 1 through 8, the reaction being conducted under reflux conditions in a solvent selected from the group consisting of methanol, ethanol, isopropanol, normal propanol, benzene, toluene, and xylene.

4. The method of preparing 2-(4-morpholinyl dithio) benzothiazole which comprises reacting N-cyclohexyl-2-benzothiazole sulfenamide with sulfur and morpholine.

5. The method of preparing 2-(4-morpholinyl dithio) benzothiazole which comprises reacting N,N-diisopropyl-2-benzothiazole sulfenamide with sulfur and morpholine.

6. The method of preparing 2-(4-morpholinyl dithio) benzothiazole which comprises reacting N-tertiary butyl-2-benzothiazole sulfenamide with sulfur and morpholine.

References Cited in the file of this patent

UNITED STATES PATENTS

| | | |
|---|---|---|
| 1,544,687 | Sebrell et al. | July 7, 1925 |
| 2,273,321 | Jones | Feb. 17, 1932 |
| 2,382,793 | Howland | Aug. 14, 1945 |
| 2,779,761 | Kibler | Jan. 29, 1957 |
| 2,837,519 | Hardman | June 3, 1958 |

FOREIGN PATENTS

| | | |
|---|---|---|
| 711,236 | Great Britain | June 30, 1954 |